HARRAH & BALDWIN.
Grain-Drill.
No. 25,011.  Patented Aug. 9, 1859.
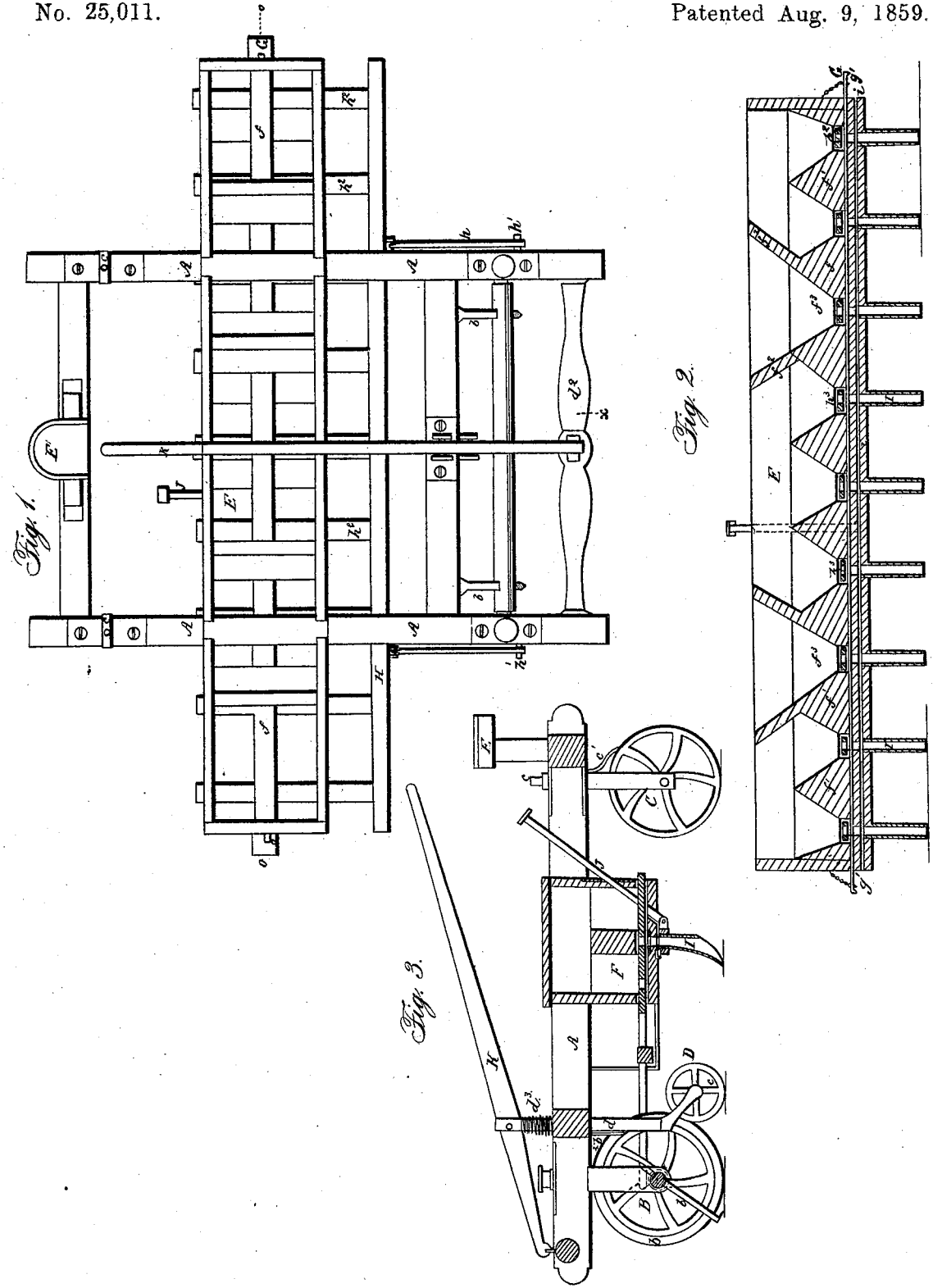

UNITED STATES PATENT OFFICE.

W. D. HARRAH AND B. S. BALDWIN, OF DAVENPORT, IOWA.

IMPROVEMENT IN SEED-PLANTERS.

Specification forming part of Letters Patent No. 25,011, dated August 9, 1859.

*To all whom it may concern:*

Be it known that we, WILLIAM D. HARRAH and BENONI S. BALDWIN, both of Davenport, in the county of Scott and State of Iowa, have invented certain new and useful Improvements in Seed-Drills, of which the following is a full, clear, and exact description, reference being had to the accompanying drawings, which make part of this specification, and in which—

Figure 1 represents a plan or top view of a machine embracing our improvements, the lid of the seed-trough being removed to show the arrangement of the hoppers. Fig. 2 represents a vertical transverse section through the same at the line *o o* of Fig. 1, and Fig. 3 represents a vertical longitudinal section through the same at the line *x x* of Fig. 1.

Our improvements have more special reference to machines for planting corn, but they can readily be applied to those for sowing seed of any description; and our invention consists in certain peculiar arrangements of the mechanism of a seed-drill, whereby we are enabled to secure the accurate disposition of the seed in the rows and at the same time facilitate the operation of the machine.

A suitable frame, A, is supported on four wheels, B C, the front ones, B, of which are fast on their shaft and turn with it. Adjustable markers $b$ are screwed into the shaft of the leading-wheels B to mark out the squares properly. The wheels B have sharp flanges $b'$ on their peripheries, which serve to cut up any sods lying in the path of the seed-tubes, and thus insure the proper disposition of the seed in the ground. Bifurcated scrapers $b^2$ project downward from the frame in rear of the wheels and embrace their flanges in order to prevent an accumulation of soil, which otherwise would soon clog the wheels and prevent the operation of the flanges. The rear wheels, C, turn in bearings in brackets projecting downward from the frame, which carry screwed spindles on their upper ends. These spindles pass entirely through the frame, and are adjusted by means of nuts $c$ and held in place by pins inserted into holes in the spindles under the frame. By this means the height of the frame from the ground, and consequently that of the carrier-tubes, is determined. Concave grooves are formed in the peripheries of the wheels C for the purpose of pressing down the earth upon the seed just dropped through the tubes. As the front and rear wheels and the tubes between them are all in a right line, there can be no failure to perform this duty. Suitable scrapers, $c'$, prevent the grooves from becoming clogged.

A caster-wheel, D, is mounted on a rectangular spindle, $d$, which plays through a slot in the front cross-bar of the frame. A lever, K, is pivoted near its center to the top of this spindle and at its front end to the roller $d^2$, while its rear end extends back to the driver's seat. A spiral spring, $d^3$, coiled around the spindle between the lever and the cross-bar, keeps the caster-wheel clear of the ground while the planting is going on.

The seeding mechanism consists of a long box or trough, F, divided into numerous compartments by means of a longitudinal partition, $f$, and a series of transverse partitions composed of angular blocks $f'$, the shape of which insures the proper feeding of the seed as long as there is any left in the box. When corn alone is to be planted boards $f^2$ are inserted into grooves cut in the side of the box or trough F, thus forming larger hoppers, $f^3$, which alone are filled. A series of holes are formed in the bottom of the trough, one to each division. A sliding plate, G, correspondingly perforated, passes over these holes, and is screwed in any desired position relatively thereto by means of pins $g$, inserted into holes in each end of the plate, by which means the quantity of seed sown is regulated.

The slide-frame H has a reciprocating motion imparted to it by means of pitmen $h$ and crank-pins $h'$ on the leading-wheels B. This frame carries a series of parallel slides, $h$, which traverse the bottom of each hopper, and are perforated with holes $h^3$ for the passage of the seed at suitable intervals, the length of which may be regulated by increasing or diminishing the number of holes in each of the slides. The seed-tubes I are secured to a bar, $i$, having its front side hinged to the under side of the trough and a lever, J, pivoted to its rear side and extending up through the frame to the driver's seat, so that the attendant, by simply placing his foot on the end of the lever, can throw the points of the seed-tubes forward and upward under the frame, where they will be out of the way and in no danger of being caught by projections on the ground. The attendant occupies a seat, E, on the rear of the frame, from which position he can, while driving the team with one hand, depress the disengaging-lever K with the other to disconnect the slides and stop the feeding mechanism, while with his foot he depresses the lifting-lever J and elevates the seed-tubes I.

The operation of the machine is as follows: The parts being properly adjusted and the team harnessed thereto in any suitable manner, the driver mounts his seat and starts. The rotation of the leading-wheels and their shaft causes the markers to strike the ground at suitable intervals, the slide-frame is reciprocated by the same means, and the seed drops through the holes and tubes at each stroke of the slides. If the attendant wishes to stop the planting, he depresses the lever K, which lifts the leading-wheels off the ground and stops the motion of the slides, when the machine can be moved freely in any direction without wasting the seed, and by simply releasing the lever the seeding mechanism is at once again put in motion. If an obstruction which would endanger the seeding-tubes should present itself, the driver has only to depress the lever J with his foot, and they are at once removed out of the way of the same, and when his foot is removed from the lever they instantly resume their working posture. Several different kinds of seed may, if desired, be sown at the same time without any danger of their becoming mixed.

Having thus fully described the construction and operation of our improved seeding-machine, that which we claim therein as new, and desire to secure by Letters Patent, is—

1. The combination and arrangement of the peculiarly-constructed hopper F $f f' f^2 f^3$, regulating-plate G, sliding frame H, slides $h^2$, pitmen $b$, edged leading-wheels B, hinged seed-tubes I, grooved covering-wheels C C, foot-lever J, caster-wheel D, and hand-lever K, all substantially as and for the purpose herein described.

2. In combination with the hopper F, the arrangement of the foot-lever J and hinged bar $i$, when the latter is so hinged as to throw the points of the seed tube forward in their adjustment or when the foot-lever is depressed, substantially as and for the purpose described.

WILLIAM D. HARRAH.
BENONI S. BALDWIN.

Attest:
JAMES T. LANE,
WM. CROSSON.